United States Patent [19]

Ladd

[11] 4,058,828
[45] Nov. 15, 1977

[54] DOCUMENT COPYING APPARATUS

[75] Inventor: John H. Ladd, Rochester, N.Y.

[73] Assignee: Eastman Kodak Company, Rochester, N.Y.

[21] Appl. No.: 740,699

[22] Filed: Nov. 11, 1976

Related U.S. Application Data

[63] Continuation of Ser. No. 580,632, May 27, 1975, abandoned.

[51] Int. Cl.² .......................... H04N 1/46; H04N 1/26
[52] U.S. Cl. .......................................... 358/80; 358/78
[58] Field of Search ...................... 358/80, 75, 76, 77, 358/78, 79, 130

[56] References Cited

U.S. PATENT DOCUMENTS

| | | | |
|---|---|---|---|
| 3,663,396 | 5/1972 | Gundlach | 355/17 |
| 3,679,818 | 7/1972 | Courtney-Pratt | 358/75 |
| 3,682,628 | 8/1972 | Gundlach | 358/75 |
| 3,783,185 | 1/1974 | Spaulding | 358/63 |
| 3,864,697 | 2/1974 | Dillon | 354/5 |

Primary Examiner—Howard W. Britton
Attorney, Agent, or Firm—Milton S. Sales

[57] ABSTRACT

Copying apparatus includes a document reader for generating a series of electrical signals which are representative of imagewise information in an original document, a printer device, and electrical means for (1) transforming, (2) storing, (3) processing and (4) applying the signals to the printer for producing on print material an imagewise representation of the information contained in these signals. The copying apparatus includes means for generating electrical color signals, means for providing different electrical bandwidths for the several color signals, a color difference matrix for generating two mutually orthogonal chrominance signals, an electrical unsharp mask for suppressing noise in at least one of the signals and for enhancing the edge contrast of the final print, means to convert the signals to forms more efficient for applying corrective functions thereto, a buffer and data transmission link, table look-up means to enhance color reproduction and to correct for various characteristics which would result in inferior prints, and means to convert the signals to a form more efficient for controlling a color printer.

20 Claims, 5 Drawing Figures

DOCUMENT COPYING APPARATUS

This is a continuation of application Ser. No. 580,632, filed May 27, 1975, now abandoned.

CROSS-REFERENCE TO RELATED APPLICATIONS

Reference is hereby made to commonly assigned, copending U.S. patent application Ser. No. 550,104, filed Feb. 13, 1975, entitled SYNCHRONIZING CONTROL APPARATUS FOR ELECTROGRAPHIC APPARATUS USING DIGITAL COMPUTERS, in the names of Hunt et al., now U.S. Pat. No. 4,025,186.

BACKGROUND OF THE INVENTION

1. Field of the Invention

The present invention relates to document copying apparatus, and more particularly to means for generating and modifying electrical signals and for applying those signals to an exposure station.

2. Description of the Prior Art

Document copiers which include reader devices for generating electrical signals representative of imagewise information in an original scene and for applying the signals to the controls of an exposure station are known in the prior art. For instance, co-assigned U.S. Pat. No. 3,783,185, which issued to Richard A. Spaulding on Jan. 1, 1974, discloses a laser printer in which a color transparency is scanned and three electrical signals, representative of the color information of the transparency, control the color output of the laser as it scans the print material. However, that patent discloses no means for correcting the signals to correct for characteristics of the original document which would result in inferior prints.

Certain techniques for transformation and enhancement of electrical color signals have been utilized in other environments. For instance, in the television arts it is well known to generate a video signal and to apply certain signal correction techniques thereto. However, heretofore the manner in which such techniques can be advantageously utilized in the document copier field has not been recognized. Also, such known techniques for correcting signals are not directly applicable for utilization in document copiers and improved, more efficient techniques, specifically adapted for the particular purpose of copying documents, are required to allow transformation and enhancement in that environment.

SUMMARY OF THE INVENTION

By the present invention I have provided document copying apparatus for generating, transforming, storing and enhancing electrical signals which are representative of imagewise information in an original document or of the original scene represented in the original document.

In a preferred embodiment, I have provided apparatus for generating an electrical luminance signal and two orthogonal chrominance signals of limited bandwith; (i.e., two chrominance signals which vary linearly independently from each other) for performing electrical unsharp masking of the luminance signal; for converting the signals to forms more convenient for buffering the signals and for applying corrective functions thereto in order to compensate for various characteristics of the original document and/or the scanning process which would result in inferior prints; and means to reconvert the resulting signal to a form more efficient for use by a given printer.

In the preferred embodiment described hereinafter, I have shown the present invention in a color copier combination. However, it is to be understood that certain of the novel features of the invention are equally adapted for use in black-and-white copying and for use in combination with facsimile transmission equipment not necessarily associated with a printer output. Also, certain of the novel features, though previously known in non-analogous apparatus, are novel in the field of document copying.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

The present description will be directed in particular to elements forming part of, or cooperating more directly with, apparatus in accordance with the present invention. It is to be understood that elements, components and/or subcomponents not specifically shown or described may take various forms well known to those skilled in the art.

In the following description and in the preceding discussion, I have referred to document copiers as a preferred environment of the invention. By the term "document copier", I mean apparatus adapted to sense the imagewise information on an original document (which may be a reflective print or transparency) and to form a second document containing such imagewise information.

Figure 1:
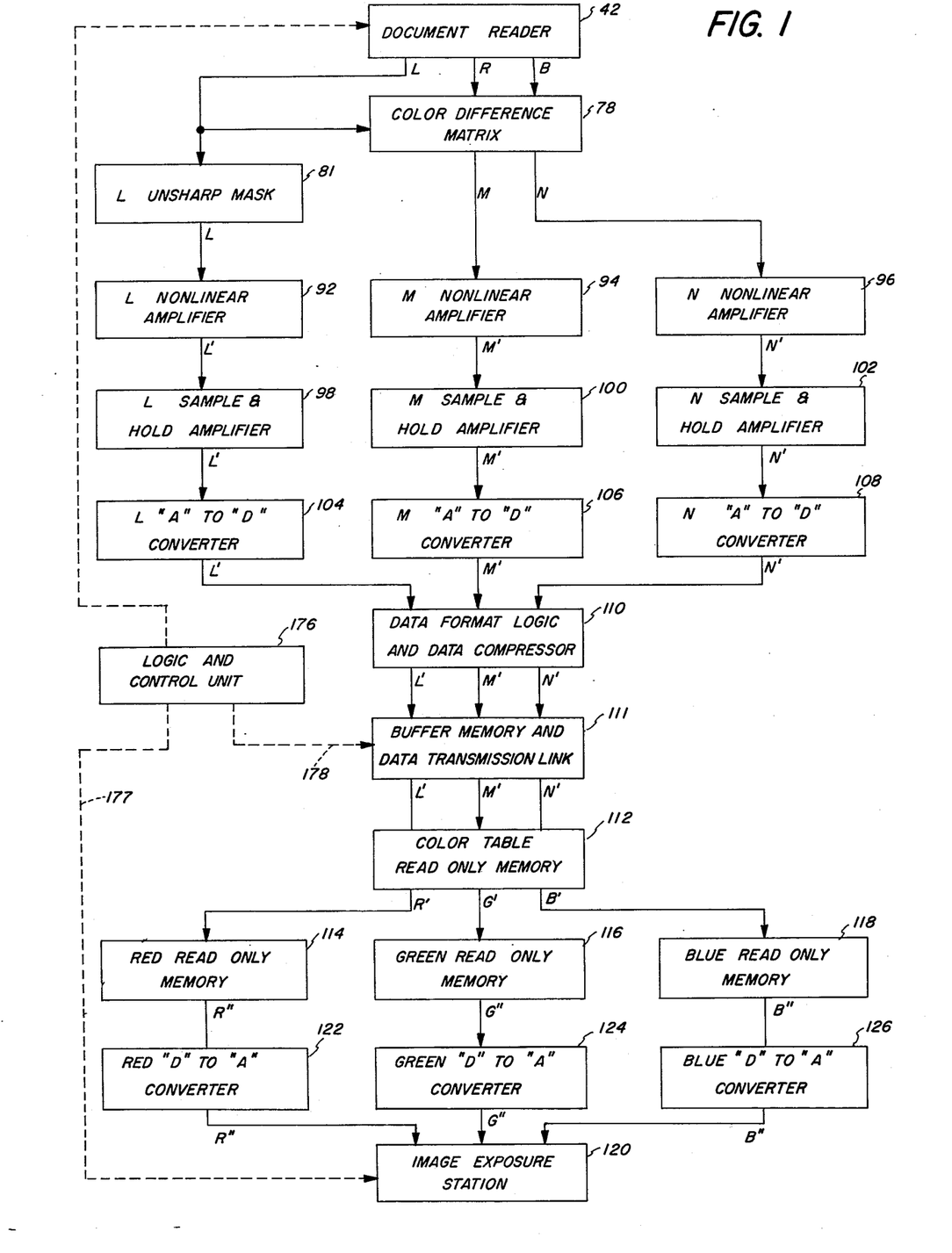
FIG. 1 is a block diagram of various components of the present invention.

In FIG. 1, I have shown a block diagram of the various components which make up a preferred embodiment of the present invention. Each block will be explained in detail hereinafter, but generally, the apparatus of this embodiment involves (1) generating electrical signals representative of the color information in an original document, (2) converting the electrical color signals into one luminance signal plus two essentially orthogonal chrominance signals, (3) differentially narrowing the bandwidth of the two chrominance signals, (4) applying unsharp masking techniques to the luminance signal to enhance edge sharpness and/or suppress noise resulting from grain, dirt, scratches or matte finish on the original document or blemishes in scanner optics or electronics, (5) converting the resultant signals to forms more efficient for subsequent buffering and applying corrective functions, (6) buffering the electrical signals, (7) processing the signals by a color table lookup to compensate for various characteristics of the original document, the scanning process and the image forming process by enhancing color reproduction from the colorant set in the original document and correcting for saturation losses, hue errors and contrast errors, (8) converting the processed signals to forms more suitable for controlling an exposure station.

THEORY

The rationale for many features of the preferred embodiment of my invention can be understood more readily if preceded by a discussion of the theory of color perception and color reproduction. More particularly, the illustrated embodiment shows apparatus by which electrical signals representative of color information are transformed into a more efficient form for handling such electrical signals. Black-and-white information and monochrome information are here considered to be simplified subsets of color information.

Reference is made to the following books and journal articles: (1) Gunter Wyszecki and W. S. Stiles, *Color Science Concepts and Methods, Quantitative Data and Formulas,* John Wiley and Sons, Inc., 1967, hereinafer referenced as Wyszecki and Stiles; (2) Robert W. G. Hunt, *The Reproduction of Color,* edition 2, John Wiley and Sons, Inc., 1967, hereinafter referenced as Hunt; (3) Ralph M. Evans, Welsey T. Hanson, and W. Lyle Brewer, *Principles of Color Photography,* John Wiley and Sons, Inc., 1953, hereinafter referenced as Evans, Hanson and Brewer; (4) David L. MacAdam, "Color Discrimination and the Influence of Color Contrast on Visual Acuity", Revue d'Optique, Vol. 28, No. 3, pages 161 to 173, March 1949, hereinafter referred to as MacAdam-1; (5) David L. MacAdam, "Colorimetry", pages 6-182 to 6-197 in *American Institute of Physics Handbook,* edition 3, McGraw-Hill, 1972, hereinafter referred to as MacAdam-2; (6) David L. MacAdam, "Role of Luminance Increments in Small Color Differences", section 14, pages 160–170, *Color Metrics,* AIC/-Holland, 1972, hereinafter referred to as MacAdam-3; and (7) John H. Ladd and Jack E. Pinney, "Empirical Relationships with the Munsell Value Scale", *Proceeding of the Institute of Radio Engineers,* Vol. 43, No. 9, page 1137, September 1955, hereinafter referred to as Ladd and Pinney.

Human visual perception of color can be divided into three attributes which in the Munsell Renotation System are designated as hue H, value V, and chroma C (Wyszecki and Stiles, pages 478 to 500). The Munsell value V scale is a scale which is linear with respect to human perception of neutral grays from black to peak white under specified viewing conditions, and is relatable to reflectance R or to reflected luminance L by a nonlinear, nearly cube-root function. Ladd and Pinney compare the precision of fit for linear, logarithmic, square-root, cube-root, and other functions of reflectance to the Munsell value scale.

Chrominance is the visual attribute of color which remains when the luminance attribute is excluded. Chrominance is two-dimensional and may be represented in polar coordinates, such as hue H and chroma C (or saturation) in the Munsell Renotation System, or in rectangular coordinates, such as $x$ and $y$ in the Commission Internationale de l'Eclairage (CIE) chromaticity diagram (Wyszecki and Stiles, pages 238 to 351). David L. MacAdam has shown (Wyszecki and Stiles, pages 461, 518 to 521, 528, to 538, 557, and 558; also MacAdam-1, 2 and 3) that human perception of chrominance, under specified viewing conditions, is not equally critical for all azimuths in the CIE chromaticity diagram. Rather, the locus of just noticeable differences (JND) near a given color form an ellipse. The size, eccentricity, and angular orientation of each MacAdam JND ellipse depends upon its location on the CIE chromaticity diagram.

Any nonlinear transform of a given three-dimensional color space forms a new color space. A color space is defined by a set of three attributes into which color can be divided. For example, the Munsell Renotation System defines a color space in terms of the hue, value and chroma attributes and is not linearly related to the CIE color space which is defined in terms of luminance and the two chrominance attributes hereinbefore called $x$ and $y$ (the transform is not merely a redescription of the same color space in rectangular and in cylindrical coordinates). However, MacAdam has also shown that no practical, realizable color space can transform the MacAdam JND ellipses into circles of equal diameter for all the hues, saturations, and luminances possible in any color space. When the third axis, such as either the luminance axis or the Munsell value axis, is included, the MacAdam JND ellipses become ellipsoids.

The effect of the size of the field of view upon the luminosity equivalent to a chromatic contrast is discussed in MacAdam-1, page 172. The CIE 1964 color-difference formula, chromaticity difference, color difference, and lightness are discussed in MacAdam-2, pages 6-194 to 6-195. The dependence of color-difference tolerances (tolerances which describe the bounds of human acceptance of color error in a given application) upon luminance is discussed in MacAdam-3, pages 165 to 166.

Color tolerance ellipsoids are conceptually analogous to JND ellipsoids, but define the locus of equal color error tolerances around a given point in a reference color space, for a particular application and for a specified set of viewing conditions. We are assured by D. L. MacAdam that the shapes of color tolerance ellipsoids, in a reference color space and under given viewing conditions, are often assumed to be the same as the shapes of JND ellipsoids in the same reference color space and under comparable viewing conditions. A linear scaling factor converts from JND to tolerance.

Define herein an "efficient" color space as a color space for which the electrical representation thereof can be more efficient than for other, less efficient, color spaces. The idea of efficient electrical representation is applicable to analog electrical signals and to digital electrical signals. Here, efficiency of digital representation means ability to represent the same color information with fewer data bits, or to represent more color information with the same number of data bits; and efficiency of analog representation means the ability to represent color information using a scale wherein a small increment of signal change has the same visual effect regardless of the absolute magnitude of the signal (i.e., where the signal is substantially linear with respect to human visual response). An efficient color space is important for analog signals for which the signal-to-noise ratio is to be maximized; and is important for digital signals which are to address a memory, be stored in a digital memory, or be transmitted from one location to another by telephone line, coaxial cable, microwave relay link, or other means of data transmission. For the purposes of digital data handling, all alternative color spaces which have the same bit efficiency (i.e., require the same number of binary data bits to represent the coordinates of points within the color space to required tolerances) are about equally efficient for the applications associable with those tolerance specifications.

Digital representation of each coordinate in color space is precise to plus or minus one-half of the least significant bit. The magnitude of the least significant bit has a fixed ratio to visual tolerance along that coordinate if and only if the scale of that coordinate is linear with respect to color-difference visual tolerance. It is commonly assumed that a scale which is linear with respect to visual perception of differences is also linear with respect to visual tolerances. For example, the Munsell value scale is parallel to the luminance (or luminous reflectance) axis but is not linear with respect to luminance. However, the Munsell value scale is linear with respect to human perception of luminance differences. Therefore, a digital representation which is linearly proportional to Munsell value provides the most efficient digital measure of luminance.

The two digital scales which represent the chrominance information must necessarily be essentially orthogonal to the scale of luminance information and orthogonal to each other in order to be efficient (i.e., to represent the two components of the chrominance data with a minimum number of bits). As used herein, the phrase orthogonal signals means signals which are measures of respective color attributes along orthogonal axes. Furthermore, the least significant bit for the digital representation of each chrominance factor should relate to the visual tolerance for color error for that factor by the same linear factor of proportionality as does the least significant bit on the luminance function scale to the visual tolerance for luminance error. This latter requirement is equivalent to requiring that, insofar as possible, the digital representations of luminance function and of chrominance should be in a color space for which the ellipsoids of visual tolerance become spheres of essentially constant diameter throughout the most important portions of the color space. In many applications, the colors occurring most often and the most important colors are desaturated colors near the neutral axis from black to peak white.

DOCUMENT READER

Document reader devices suitable for use with the present invention for producing electrical signals representative of the color information in the original document may take various forms well known to those skilled in the art. For instance, U.S. Pat. No. 3,783,185 discloses a document reader in which a scanning light source directed through a color transparency impinges upon a set of three photosensors which are each sensitive to a different one of the selected wavelengths, e.g., red, green or blue. The photosensors produce electrical signals representative of the red, green and blue information in the transparency.

Figure 2:
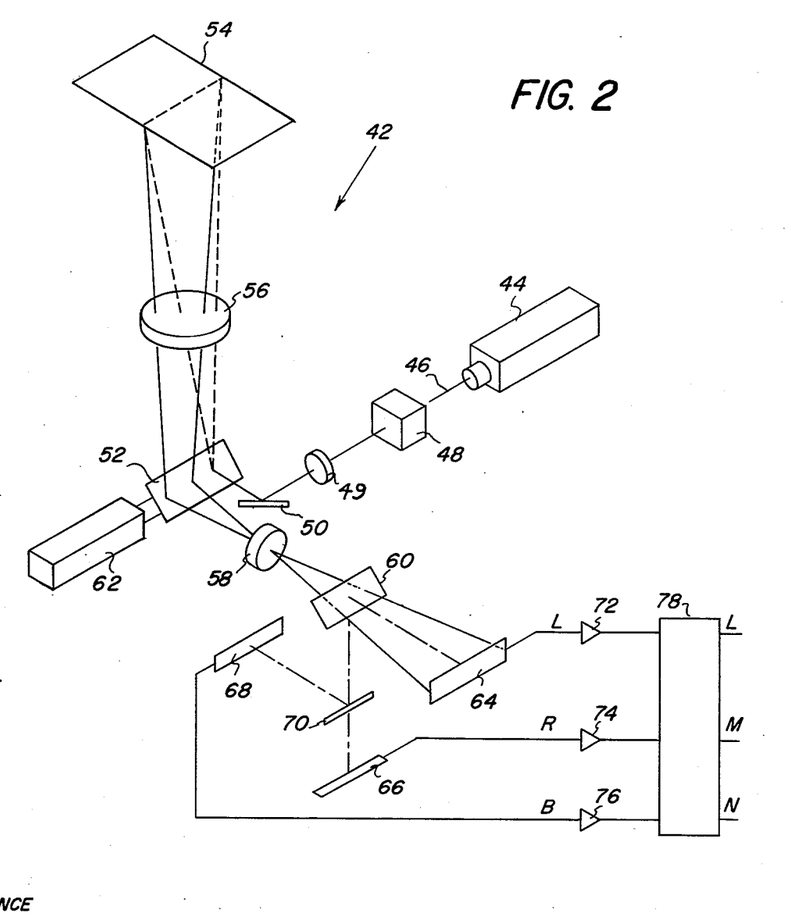
FIG. 2 is a schematic view of a document scanning device.

FIG. 2 shows another form of document scanning apparatus 42 (see also FIG. 1). A multicolor beam 46 from laser source 44 is incident on cylindrical optics 48 which spreads the beam to form a long, narrow sheet beam and "line" image on the document being scanned so that, after being reflected by a pair of mirrors 50 and 52, the line image scans along an original document 54 from end to end. A relay lens 49 transfers the sheet beam to an intermediate pupil plane on the surface of page scan mirror 52. The sheet beam passes through a final imaging lens 56 to provide a good planar image field at document 54. While in the illustrated embodiment illumination is derived from a polychromatic laser source 44, tungsten or fluorescent lamps or xenon flash lamps or other sources may be used as well.

The original document is shown as a reflective print, and the reflected light beam is once more reflected by page scan mirror 52, through an imaging lens 58 to a neutral beam-splitting mirror 60. Page scan mirror 52 is driven by a page scan galvanometer motor 62 so that successive line scans by each of three linear photosensor arrays 64, 66 and 68 progress down original document 54 in synchronism with page scan of the illuminating sheet beam. Linear photosensors 64, 66 and 68 may be replaced with self-scanned area photosensor arrays, and sheet beam illumination be replaced by area illumination.

Beam-splitting mirror 60 or a second mirror 70 or both, may be dichroic mirrors, and hence have the characteristics of primarily passing light of a selected band of wavelengths and primarily reflecting other light. However, the preferred embodiment of the present invention utilizes neutral beam-splitting mirrors to minimize possible changes in transmittance for a given wavelength of light as a function of angle of incidence to the mirror surface, especially for the elliptically-polarized, coherent radiation from one or from a multiplicity of lasers.

There are 12 ways to divide a beam of light into three components by means of two beam-splitting mirrors: the first beam-splitting mirror can isolate component 1, 2, or 3 (three alternatives); isolation at the first beam-splitting mirror can be either by transmission or by reflection (two alternatives, independent from the three alternatives listed above); the second beam-splitting mirror can isolate either of the two remaining components by transmission (two independent alternatives) and the remaining component by reflection. The total possible number of combinations is therefore $3 \times 2 \times 2 = 12$. In the preferred embodiment of the present invention, the most important color component is isolated by the first beam-splitting mirror to avoid possible optical degradation associable with the second beam-splitting mirror.

With a neutral beam-splitting mirror, it is often convenient to let transmittance be greater than reflectance. In the preferred embodiment of the present invention, the most important color component is isolated by transmission through the first beam-splitting mirror 60 in order to maximize the signal-to-noise ratio of that signal. The least important color component is isolated by reflection at the second beam-splitting mirror 70, because the signal associated with the least important color component has the least bandwidth and hence can tolerate an optical path which would yield the worst signal-to-noise ratio if the bandwidths of all the signals were equal. The above selection of beam-splitter combination (of the twelve possible combinations) is preferred, provided that areas of the original document which are intended to represent peak white reflect (or transmit) approximately equal radiant power in red, green, and blue wavelength bands and the three photosensors 64, 66 and 68 are equally sensitive to red, green and blue light.

One possible embodiment of the present invention may include three separate, monochromatic lasers as the light source, such as, for example, a helium-neon laser emitting at 632.8 nanometers, an argon laser emitting at 528.7 nanometers, and a helium-cadmium laser emitting at 441.6 nanometers. Such a light source, at the present state of the art, is likely to emit much less blue light than red or green light. Furthermore, silicon photosensors are often more sensitive to red than to blue light. Hence, a beam-splitting mirror combination other than the one described above may be preferred in order to provide adequate signal-to-noise ratio for each of the three color signals.

The preferred embodiment of the present invention employs a luminance L, red R and blue B color space at the output from document scanner. The L, R, and B signals are generated as follows: Lens 58 in FIG. 2 focuses light transmitted by beam-splitting mirror 60 upon linear charge coupled device (CCD) photosensor array 64 to form an image of the pictorial content of that part of original document 54 which is temporarily illuminated by the sheet beam of light. If original document 54 is itself a black-and-white or color reflection print which is also intended to be viewed directly by humans, photosensor array 64 is spectrally filtered to generate a luminance L signal for CIE Source C (Wyszecki and Stiles, pages 274, 275, and 471) and photopic vision (Evans, Hanson and Brewer, pages 48–50). That is, the red, green and blue spectral transmittances of the filter in front of photosensor array 64 are so selected in conjunction with the relative red, green, and blue radiant power densities actually incident on original document 54, and in conjunction with the spectral transmittance function of the optics between the original document and photosensor array 64, that, for a neutral gray area represented on the original document, the relative red, green, and blue contributions to the luminance signal L are in proportion to what the red, green and blue contributions would be if the original document were illuminated by CIE Source C and if the electrical luminance signal L were electrically generated from red, green and blue electrical signals as in conventional color television practice.

If the original document to be copied is a color photographic negative, for example, the pictorial content thereon is not intended to be viewed and interpreted directly by humans. Furthermore, such a color photographic negative may include colored couplers (reference Evans, Hanson and Brewer, pages 265 to 266, 307, 544 and 568 to 571; and Hunt, pages 179, 183, 216, 233 to 263 and 301 to 303), which further confuse attempts at direct human viewing and interpretation. For this type of original document, it would be desirable but is theoretically impossible, in general, to determine rigorously from the original document the color temperature of the original scene and the spectral reflectances of objects in the original scene depicted in the original document. However, it is possible to assume a scene illuminant and to assume that all the colors in the original scene are derived from a particular (somewhat arbitrary) set of three dyes; cyan, magenta, and yellow. It is a preferred embodiment of the present invention that, for original documents of this type, the red, green, and blue relative contributions to the luminance signal L be referred back to a mathematically realizable approximation of peak white, grays and black in the original scene, rather than peak white, grays and black in the original document per se.

Only the "L" signal is necessary for copying black-and-white documents and for the neutral gray scale of colored documents. A "color killer" switch (not shown) on the copier hardware can eliminate other, chrominance signals when black-and-white documents are to be copied and when black-and-white copies are desired from colored original documents.

Lens 58 in FIG. 2 focuses light reflected by beam-splitting mirror 60 and transmitted by beam-splitting mirror 70 upon photosensor 66 which is spectrally filtered to be responsibe only to the red spectral component of the light beam reflected from (or transmitted by) original document 54. Similarly, lens 58 in FIG. 2 focuses light reflected by beam-splitting mirrors 60 and 70 upon photosensor 68 which is spectrally filtered to be responsible only to the blue spectral component of the light beam reflected from (or transmitted by) the original document.

Three electrical pre-amplifiers 72, 74 and 76 in FIG. 2 amplify the luminance signal L, red signal R, and blue signal B, respectively. The output signal from the voltage gain stage of each such pre-amplifier is unipolar, has low a-c impedance, has an output of zero volts for each black area in the original document scanned, and is normalized to plus one volt output for each peak white area in the original document scanned. The output stage of each such preamplifier is a phase splitter to provide two output voltages of equal magnitude and phase, opposite polarity, and equal bandwidths. However, the bandwidth for signals $+L$ and $-L$ is greater than the equal bandwidths for signals $+R$, $-R$, $+B$ and $-B$. The signal bandwidths of the latter four signals are equal to, or slightly greater than, the signal bandwidth required for chrominance signal M, which in turn is greater than the bandwidth required for chrominance signal N. The definition and generation of M and N by a color difference matrix 78 are explained below. (M can denote middle bandwidth and N can denote narrow bandwidth components of the chrominance signal.)

Color Difference Matrix

Define electrical chrominance electrical signals M and N by the equations $$M = A11 * (R - L) + A12 * (B - L) \qquad \text{(EQ. 1)}$$

and $$N = A21 * (R - L) + A22 * (B - L) \qquad \text{(EQ. 2)}$$

where the constants $A11$, $A12$, $A21$ and $A22$ form a $2 \times 2$ matrix [A]. The color difference signals $(R - L)$ and $(B - L)$ may be formed by conventional analog summing or differencing circuits, since both the $+L$ and the $-L$ electrical signals are available from amplifier 72, both the $+R$ and the $-R$ electrical signals are available from amplifier 74, and both the $+B$ and $-B$ electrical signals are available from amplifier 76. Reference is made to E. M. Grabbe, S. Ramo, and D. C. Woolridge, *Handbook of Automation, Computation, and Control,* John Wiley and Sons, 1961; three volumes hereinafter identified as Grabbe, Ramo and Woolridge 1, 2 and 3. Analog summing circuits are described in Grabbe, Ramo and Woolridge 2, pages 22-04 to 22-09.

The two coefficients $A11$ and $A12$ of matrix [A] are selected such that middle-bandwidth chrominance signal M is a vector for which the amplitude is measured in a direction nominally parallel to the minor axis of MacAdam JND ellipses for near-neutral colors. The two coefficients $A21$ and $A22$ of matrix [A] are selected such that narrow-bandwidth chrominance signal N is a vector normal to M. Therefore, narrow-bandwidth chrominance signal N is a vector for which the amplitude is measured in a direction nominally parallel to the major axis of MacAdam JND ellipses for near-neutral colors. It is understood that to the extent that input signals L, R, and B have differing bandwidths, they also have different inherent phase delays. Hence it may be required to add external phase delay to wide-bandwidth luminance signal L so that its total phase delay equals that inherent in signals R and B. Equalization of phase delay assures that the simultaneous input amplitudes of L, R, and B to the color difference matrix correspond to the same location on the original document being scanned. Similarly, external phase delays may be required for output signals L and M so that their total phase delays equal that inherent in narrow-bandwidth chrominance signal N.

Again, for the purposes of this disclosure, it will be assumed that the electrical output signals R, L, and B from document scanner 42 are linear measures of relative red, luminance, and blue reflectances of each successive location in a raster on a black-and-white or color original document. It is to be understood that the invention is equally applicable to the generation and processing of signals derived from document transmittances. Furthermore, the electrical signals may represent red, green, and blue instead of red, luminance, and blue information. The direct optical generation of the luminance signal at photosensor 64 has the advantage, over prior art, that signal-to-noise ratios for the required signals in a document copier can thereby be maximized. Also, for a black-and-white or monochrome document copier, only the luminance signal is required. For such a copier the spectral sensitivity of the luminance photosensor is broad enough to assure optimal gray scale rendition in black-and-white copies of colored original documents.

UNSHARP MASK

Luminance signal L has the greatest bandwidth and hence may contain the most "noise" resulting from grain, dirt, or scratches on the original document, from matte finish on the original document, and/or from blemishes in the document scanner optics and electronics. I have provided apparatus for the reduction of such noise and for the enhancement of print sharpness by electronic unsharp masking techniques, one form of the apparatus being shown in FIG. 3. It will be recognized that FIG. 3 shows an unsharp mask 81 for the luminance signal of FIG. 1.

Figure 3:
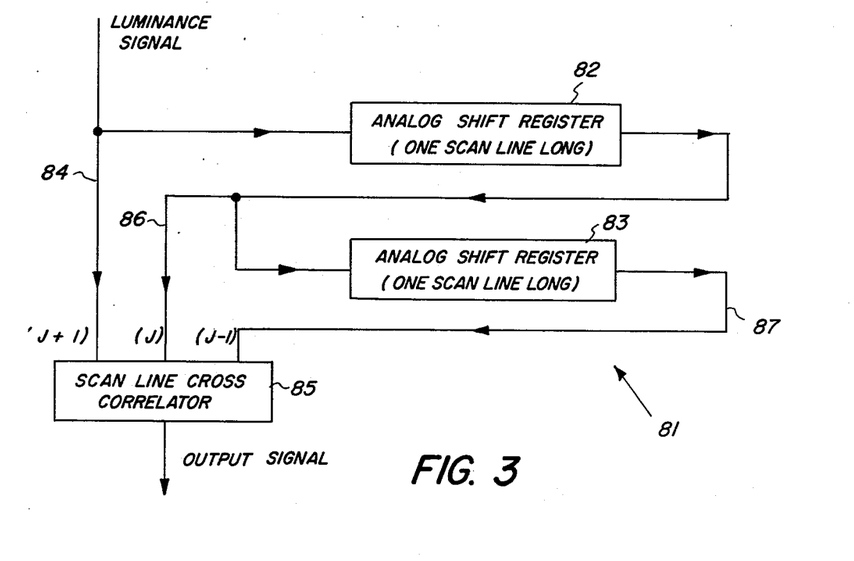
FIG. 3 is a schematic view of an electronic unsharp mask.

As a scan line, designated (J − 1), of the original document is scanned simultaneously and in synchronism by photosensors 64, 66, and 68 of FIG. 2, the electrical signals representing the luminance for each successive point along the scan line are stored in an analog shift register 82 of FIG. 3. For example, the Fairchild CCD311 130/260 analog shift register is a monolithic charge coupled device intended to be used in analog signal processing that includes analog storage and delay applications. As the next scan line, designated J, is scanned, the electrical signals from that line replace those of the preceding scan line in register 82, and the replaced signals are shifted into a second shift register 83.

Now, as the next line, designated (J + 1), is scanned, its electrical signals replace those from line J in register 82 and are simultaneously applied along conductor 84 to a scan line cross correlator 85. The signal outputs from register 82 replace those from the (J − 1) line in register 83 and are simultaneously applied along conductor 86 to scan line cross correlator 85. Simultaneously, the signals from scan line (J − 1) shift from register 83 along a conductor 87 to scan line cross correlator 85.

It is now seen that scan line cross correlator 85 of FIG. 3 serially receives the electrical signals from scan lines (J + 1), J, and (J − 1), with all three inputs synchronized such that corresponding samples from each scan line arrive simultaneously.

Figure 4:
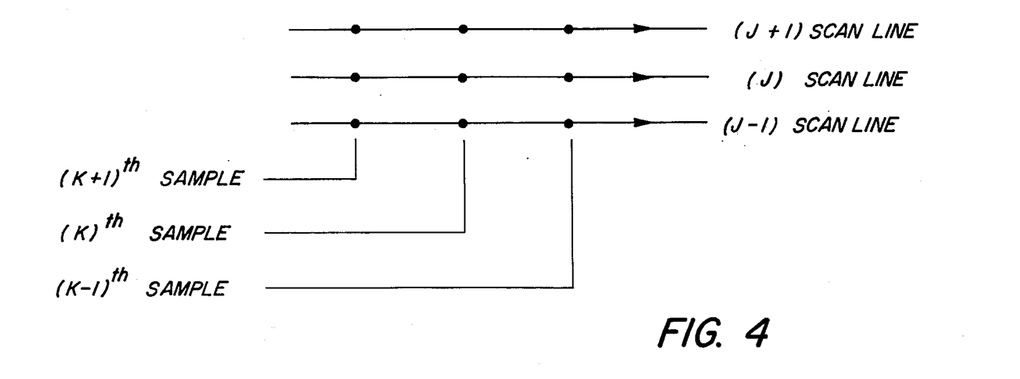
FIG. 4 is a schematic view of the timing of signals generated in the unsharp mask of FIG. 3.

Referring to FIG. 4, scan line cross correlator 85 of FIG. 3 performs edge enhancement and noise suppression by comparing the amplitude of the signal associated with one sample in a two-dimensional array of sampled information with the means among eight adjacent samples in the array. FIG. 4 depicts samples (J + 1, K + 1), (J + 1, K), and (J + 1, K − 1) from scan line (J + 1); samples (J, K + 1), (J, K), and (J, K − 1) from scan line J; and samples (J − 1, K + 1), (J − 1, K), and (J − 1, K − 1) from scan line (J − 1). Considering these nine amplitudes as a 3 × 3 matrix, the location of each amplitude in the matrix may be indicated as follows:

$$\begin{bmatrix} B11 & B12 & B13 \\ B21 & B22 & B23 \\ B31 & B32 & B33 \end{bmatrix}$$

where the matrix [B] is a moving matrix, centered at (J, K). If column sum differences are less than a reference threshold, it is inferred that there is no vertical edge through (J, K). If row sum differences are less than the reference threshold, it is inferred that there is no horizontal edge through (J, K). Similarly, the possible presence of a diagonal edge through B11, B22, and B33 may be tested by comparison of the absolute values of the differences among (B11 + B22 + B33), (B12 + B13 + B23), and (B21 + B32 + B31); and the possible presence of a diagonal edge through B13, B22, B31 may be tested by comparison of the absolute values of the differences among (B11 + B12 + B21), (B13 + B22 + B31), and (B23 + B32 + B33). If no edge is detected, B22 is reassigned an amplitude equal to the mean value of the nine elements of the matrix. If an edge detection difference exceeds threshold, B22 is assigned an amplitude which accentuates the edge detected. Analog summing and differencing are discussed in Grabbe, Ramo and Woolridge 2, pages 22-04 to 22-09.

NONLINEAR AMPLIFIERS

Referring to FIGS. 1 and 2, the document reader output electrical signals R, L, and B are inputs to color difference matrix 78. The output electrical signals from color difference matrix 78 are the middle bandwidth chrominance signal M and the narrow bandwidth chrominance signal N. The three color signals L, M and N together provide the coordinates for a color space which is linear with respect to reflectance (or to transmittance) if the original document is intended also for direct viewing. However, if the original document is, for example, a color photographic negative with photographic gamma of, say, 0.70, then the three color signal outputs L, R and B from the document reader are nearly linear with respect to the square-root of transmittance. (Photographic gamma is discussed in Hunt, pages 209 and 216, and in Evans, Hanson and Brewer, page 192 and is the slope of the generally straight line portion of the characteristic curve of a photographic emulsion.

I have provided three nonlinear amplifiers 92, 94 and 96 (FIG. 1) to perform the nonlinear transformations required on electrical signals L, M, and N to generate three new electrical signals L', M', and N', respectively. The new signals are intended to represent color information in a color space which is, insofar as possible, linear with respect to human visual color tolerance errors. Furthermore, the new electrical color signals L', M', and N', are scaled so that equal signal amplitudes represent equal multiples of color difference tolerances. That is, signals L', M', and N' are intended to represent colors by a color space for which the color error tolerance ellipsoids approximate spheres of equal diameter over most of the important portions of the total color space. The approximations are, of course, subject to the theoretical limitations described earlier in the preceding section titled "Theory".

Electrical color signals L', M', and N' provide a most efficient way to represent points in color space, provided the relative bandwidths among these signals are consistent with the relative spatial resolutions for these color coordinates referred back to the original document to be copied. For the finest detail, the human eye is essentially color-blind, and only the electrical luminance signal L' is required in order to reproduce that detail in each copy. For somewhat grosser details in color images, the middle-bandwidth chrominance signal M' begins to contribute to visual perception of images. For image information of still lower spatial frequencies, the electrical narrow-bandwidth chrominance signal N' begins to contribute to visual perception of images.

ANALOG TO DIGITAL CONVERSION

Blocks 98, 100 and 102 (FIG. 1) are conventional electrical sample and hold amplifiers for electrical signals L', M', N', respectively. Blocks 104, 106 and 108 of FIG. 1 are conventional electrical analog to digital converters which operate in synchronism with sample and hold amplifiers 98, 100 and 102, respectively, to digitize electrical color signals L', M', and N', respectively.

In a preferred embodiment of the present invention, each of the three electrical color signals is sampled, held, and digitized at a rate consistent with the electrical bandwidth of that signal. The sampling of analog signals is a familiar topic, discussed in many text books. See, for example, R. B. Blackman and J. W. Tukey, *The Measurement of Power Spectra From the Point of View of Communications Engineering*, New York Dover Publications, Inc., 1958, and Alfred K. Susskind (editor), *Notes on Analog-Digital Conversion Techniques*, Cambridge, The Technology Press, 1957.

Basically, sampling theory tells us that if the sampling rate is too low for a given bandwidth of the input analog signal, the power spectrum above the Nyquist frequency can introduce serious degradation of the sampled data due to aliasing of frequencies above the Nyquist frequency. On the other hand, if the sampling rate is much higher than required for a given bandwidth of the input analog signal, the number of samples to be digitized and subsequently processed becomes unnecessarily great. Many economic disadvantages can accrue from an unnecessarily high sampling rate; the analog to digital converter must function faster, the buffer memory must have more capacity and subsequent digital signal processing hardware must function faster. Some or all of these results may contribute unnecessarily to manufacturing cost of the hardware.

Also for the sake of economy, the number of binary bits to which each color signal is digitized is kept to a minimum consistent with the ratio of tolerable quantization error to total range of the variable digitized. For example, if only 32 luminances need to be discriminated for a particular application, a five-bit analog-to-digital converter is required at block 104 in FIG. 1; if 16 middle-bandwidth chrominances need to be discriminated for that application, a four-bit analog-to-digital converter is required at block 106; and if eight narrow-bandwidth chrominances need to be discriminated for that application, a three-bit analog-to-digital converter is required at block 108.

It should be noted that color signals L, R, and B from the document reader are unipolar; they have magnitude but not sign. Similarly, the digital signal L' output from luminance analog-to-digital converter 104 is unipolar. However, the digital output signals M' and N' from middle bandwidth chrominance analog-to-digital converter 106 and from narrow bandwidth chrominance analog-to-digital converter 108, respectively, are both bipolar; those two digital signals have both magnitude and sign. The sign bit is included in the examples proposed above. Whether the bipolar digital signals are handled by magnitude and sign, or by complementary offset binary code, is immaterial to this patent.

DATA FORMAT LOGIC AND DATA COMPRESSOR

A data format logic and data compressor 110 of FIG. 1 organizes the digital data for efficient storage or data transmission. Design details of the data format logic depend upon the relative sampling rates of sample and hold amplifiers 98, 100 and 102. In a preferred embodiment of the present invention, those relative sampling rates are related by simple integers in order to simplify the data format logic. In the hypothetical example proposed above, the precisions of analog-to-digital converters 104, 106 and 108 were assumed to be five bits, four bits, and three bits, respectively, for a given hypothetical application.

Assume further, in that example, that the sampling rates for sample and hold amplifiers 98, 100 and 102, and that the rates of analog-to-digital converters 104, 106 and 108, respectively, are in the ratios of four to two to one, respectively. Then it is convenient to work with four 5-bit words plus two 4-bit words plus one 3-bit word at a single address. Under such circumstances, word length includes $(4 \times 5) + (2 \times 4) + (1 \times 3) = 31$ data bits. The data format logic can accept as input these seven analog-to-digital converter words and can combine the analog-to-digital converter outputs into a single word of 31 data bits for bit-parallel input to the next stage.

In some applications, it may be desirable to add one or more check bits to each large word sent out from the data format logic. (Reference, R. W. Hamming, "Error Detecting and Error Correcting Codes," Bell System Technical Journal, volume 26, number 2, pages 147 to 160; April 1950.) In the hypothetical example quoted, the word output rate from data format logic equals one-fourth the data word output rate of luminance analog-to-digital converter 104 in FIG. 1.

BUFFER MEMORY AND DATA TRANSMISSION LINK

I have shown a digital buffer memory and data transmission link 111 at the output of data format logic and data compressor 110. Buffer memories and data transmission links in color copiers are well known, and the reader's attention is directed to U.S. Pat. No. 3,679,818, which issued on July 25, 1972 to J. S. Courtney-Pratt as an example. Such devices permit (1) the original document to be handled and scanned only once regardless of the number of copies to be generated, (2) a multiplicity of original documents to be scanned at one rate and the copies thereof to be generated at a different rate not necessarily synchronous with document reading, (3) the physical separation of the document reader and the exposure station, and (4) the incorporation of a multiplicity of document readers interconnected among a multiplicity of copy exposure stations.

While buffer memories and data transmission links are well known, I have located such a device 111 in the data handling chain of FIG. 1 at a position in which the required memory size and for which the required bits per transmitted message are minimized by the novel efficient color space and the novel efficient data format which result from the "upstream" apparatus previously described.

COLOR TABLE READ-ONLY MEMORY

The concepts of color masking and of colored couplers in photographic products are well known to persons familiar with the art. Reference is made to Hunt, pages 55, 233 to 263, 445, and 464 to 470; see also Evans, Hanson and Brewer, pages 542 to 544, 567 to 578, and 592 to 610. Color masking is accomplishable optically or by chemicals in a color photographic product and process. Ideally, color masking provides a basis for obtaining the best possible reproduction from a given set of color image forming materials in the original to be copied and for a given set of color image forming materials at the copy exposure stations. To quote Hunt, page 55, "It will be realized that these three expedients cannot correct for the fundamental limitations of the process, which spring from the nature of the colour mechanism of the eye and the shape of the spectral absorption curves of the best available cyan, magenta, and yellow dyes. What is claimed for modern subtractive processes is that they produce pleasing colour pictures, and that the inevitable inaccuracies are balanced in such a way as to be least noticeable." Masking was one of the expedients referred to.

I have provided a color table read-only memory 112 (FIG. 1) to accomplish electronically the objectives sought by color masking in color photographic systems. That is, the color table read-only memory means of the present invention provides signal processing to compensate for various characteristics of the original document, the scanning process and the image-forming process by (1) enhancing color reproduction from the colorant set in the original document, (2) correcting for saturation losses, (3) correcting for hue errors and (4) correcting for contrast errors. The following simple, linear color matrix can solve the following set of simultaneous equations for each picture element in the original document to be copied:

$$R' = C11 * L' + C12 * M' + C13 * N' \quad \text{(Eq. 3)}$$

$$G' = C21 * L' + C22 * M' + C23 * N' \quad \text{(Eq. 4)}$$

$$B' = C31 * L' + C32 * M' + C33 * N' \quad \text{(Eq. 5)}$$

where the three color signal inputs are L', M', and N'; the three color signal outputs are R', G', and B'; and the nine constants (C11 to C33) form a 3 × 3 matrix [C].

However, a 3 × 3 matrix provides only a linear, first approximation to solution of the general color masking problem. A second approximation, with a 3 × 10 matrix, can include some nonlinear effects such as the squares of the three input color signals, the linear cross products of the three color signals, and a constant term for each equation.

In the present invention, color matrix read-only memory 112 provides a digital, table look-up method to solve a color matrix for each picture element of the original document to be copied in a fast, precise manner. Furthermore, color table read-only memory 112 has the advantage that any set of three color matrix equations, either linear or nonlinear, can be solved thereby with no increase in hardware complexity, no loss in speed, and no loss in hardware stability when nonlinearities are included in the assumed functional relationships among the three digital input signals and the three digital output signals.

The concept of storing digital data in a read-only memory is well known to those skilled in the art. For example, the Harris Semiconductor HPROM-0512-5B programmable read-only memory is a field-programmable, read-only memory (ROM) which stores 512 digital binary data bits, organized with eight bits per word at 64 addresses. Read-only memories of larger data storage capacity, such as 4096, 8192, or 16,384 binary bits, are also known. Furthermore, individual read-only memory devices can be combined in an array to provide longer words and more addresses.

A preferred embodiment of the present invention employs one or more arrays of read-only memories to construct color table read-only memory 112. Digital data signals L', M', and N', either from data format logic and data compressor 110, or directly from analog-to-digital converters 104, 106 and 108, provide the address input information to the ROM. Corresponding values of digital data color signals R', G', and B' are stored at each address in the ROM. Such construction permits a "table look-up" operation to occur. The ROM provides one address for each possible combination of inputs L', M', and N'. A total of 4096 addresses are required if L' has 5 data bits, M' has 4 data bits, and N' has 3 data bits, for example, as in the hypothetical example previously mentioned.

If all the data bits of L', M', and N' are significant in the determination of R', G', and B', then a preferred embodiment of the present invention stores one long word at each address, that word including the values of R', G', and B' associable with that address. I have made excellent photographic color prints with 8-bit precision for R', G', and B', although the experimental hardware had a capability of 10-bit precision for R', G', and B'.

Some applications may require that the precisions of L', M', and N' be greater than 5 bits, 4 bits, and 3 bits respectively, as in the hypothetical example previously mentioned. If the precisions required for L', M', and N' are 6 bits, 5 bits, and 4 bits, respectively, the total number of addresses required in a single color matrix ROM become $2^{(6+5+4)} = 2^{15} = 32,768$ addresses. However, in a given application, it may occur that one or more of the least significant bits for one or two of the digital input signals do not contribute significantly to the digital output value of one or two of the output signals. In such a circumstance, the total size (i.e., the total number of bits stored) of the ROM can be reduced by separating the ROM into three separate ROMs, one for each of the original output signals.

For example, assume in a hypothetical application that the required precisions for L', M', and N' are 6 bits, 5 bits, and 4 bits, respectively. Furthermore, assume that the functional relationships between input signals L', M', and N' and output signals R', G', and B' are as follows:

$$R' = f[L'(5 \text{ bits}), M'(5 \text{ bits}), N'(3 \text{ bits})] \quad \text{(Eq. 6)}$$

$$G' = f[L'(6 \text{ bits}), M'(4 \text{ bits}), N'(3 \text{ bits})] \quad \text{(Eq. 7)}$$

$$B' = f[L'(5 \text{ bits}), M'(4 \text{ bits}), N'(4 \text{ bits})] \quad \text{(Eq. 8)}$$

where each $f(L', M', N')$ denotes some general function of those three input signls, and the number of bits indicated in parenthesis after each input signal indicates the required precision for that input signal to that functional relationship. Furthermore, for purposes of illustration assume that the required precisions of the digital output signals R', G', and B' are 6 bits, 7 bits, and 5 bits, respectively. If color table read-only memory 112 of FIG. 1 is implemented by a single ROM, the required number of addresses is 32,768 and the required number of bits per address is (6 + 7 + 5) = 18; therefore the required ROM size is 32,768 * 18 = 589,824 data bits.

However, it is permissible to divide the ROM into three separate ROMs: one in which to look up the appropriate value of R', one in which to look up the value of G', and one in which to look up the value of B'. The required number of addresses in the R' ROM is $2^{(5+5+3)} = 2^{13} = 8192$ addresses, with 6 bits of digital data stored at each address. Hence the required size of the R' ROM is 8192 * 6 = 49,152 data bits under the hypothetical requirements assumed herein. Similarly, the required number of addresses in the G' ROM is $2^{(6+4+3)} = 2^{13} = 8192$ addresses, with 7 bits of digital data stored at each address. Hence the required size of the G' ROM is 8192 * 7 = 57,344 data bits. Similarly, the required number of addresses in the B' ROM is $2^{(5+4+4)} = 2^{13} = 8192$ addresses, with 5 data bits stored at each address. Hence the required size of the B' ROM is 8192 * 5 = 40,960 data bits. The total size of the three separate ROMs is 147,456 data bits, just one-fourth as large as would be required if color table read-only memory 112 were organized as one large ROM instead of three separate ROMs.

Therefore, it will be preferred that color masking be accomplished in color table read-only memory 112 by digital table look-up either in one ROM or in three separate ROMs, one for each digital output signal, whatever organization yields the smallest required ROM size.

The information to be stored in color table read-only memory 112 is determinable by calibration techniques analogous to those for photographic color masking, described by Hunt, by Evans, Hanson and Brewer and by others in the published technical literature.

EXPOSURE TIME DELAYS

Exposure time delay networks (not shown) may be provided to permit non-simultaneous exposure of the three color image forming materials at three physically separated image exposure stations. It is immaterial which two digital signals are delayed, among R', G', and B'. Furthermore, it is immaterial which of the two delayed digital signals is delayed longer than the other. These alternatives are determinable by practical considerations at the image exposure station. Indeed, it may be practical to accomplish two or all three exposures simultaneously at the same image exposure station and eliminate the need for one or both of the digital time delays.

Each exposure time delay can be built from conventional digital, serial-in, serial out shift registers; with one shift register for each data bit in the digital data signal to be delayed and with one shift location for each picture element associable with the time delay required.

RED, GREEN, AND BLUE READ-ONLY MEMORIES

I have provided a red read-only memory 114, green read-only memory 116, and blue read-only memory 118 (FIG. 1) to convert the output signals R', G', and B' from the color space in which color matrix read-only memory 112 generates its outputs into the color space which is linear with respect to the control signals R'', G'', and B'', respectively, required to control exposure at an exposure station 120.

These three color read-only memories function in the same manner as the color matrix read-only memory described above. Indeed, the functional objectives of the three color read-only memories can be incorporated into the information stored in color table read-only memory 112. The choice of separate color read-only memories versus incorporation of the functional objective into the color table read-only memory is primarily a matter of economics for the hardware for a given set of applications. The choice depends, in part, upon the required number of input bits and required number of output bits for each color read-only memory. I have generated excellent color photographic prints with 8-bit precision for R'', G'', and B''; although the experimental hardware was wired to provide a capability for 12-bit precision.

The digital output words from the red, green and blue read-only memories 114, 116 and 118 are converted from digital-to-analog control currents by respective digital-to-analog converters 122, 124 and 126. The analog control currents control the red, green and blue components of the radiant power in color exposure apparatus 120.

ALTERNATIVE EMBODIMENTS

In some applications, it may be desirable and satisfactory to relocate color difference matrix 78 of FIG. 1 to a position following nonlinear amplifiers 92, 94 and 96. Further, it may prove economical in certain cases to eliminate color differnce matrix 78 altogether. In such a case, the functional relationships expressed by matrices [A] and [C] hereinabove are then combined into matrix [C] in color table read-only memory 112.

A simplified alternative to the above is to let the color output signals from document reader 42 be representative of green, red and blue information read from the original document. The document reader output signals can then be designated as G, R, and B and the digital signals from analog-to-digital converters 104, 106 and 108 can provide direct inputs to color table read-only memory 112.

IMAGE EXPOSURE STATION

Image exposure station 120 may take many forms. For instance, the laser color printing apparatus disclosed in U.S. Pat. No. 3,783,185 may be used, receiving its control information directly from digital-to-analog converters 122, 124 and 126 as controlled by buffer memory 111.

Figure 5:
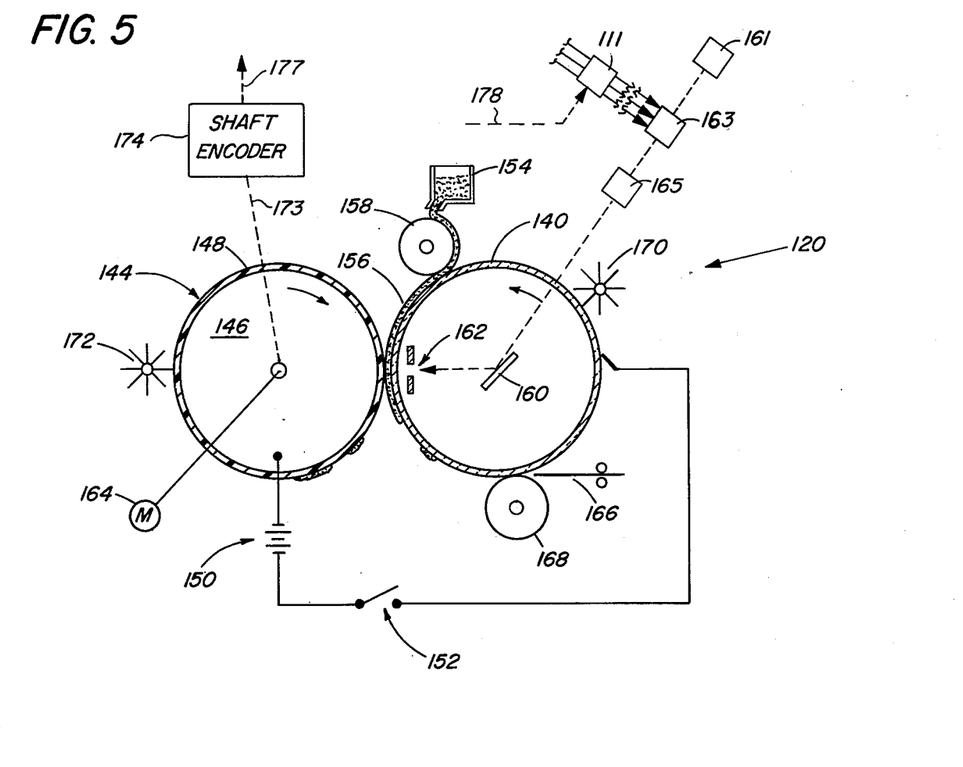
FIG. 5 is a schematic view of an image exposure station.

In FIG. 5, I have shown a copier apparatus which, in operation, forms a direct positive image on the surface of an imaging roller 140 by the process of electrophoresis. Imaging roller 140, commonly referred to in the art as the injecting electrode, is made of Nesa glass. (Nesa glass is a trademark of PPG Industries used to designate an optically transparent glass overcoated with a thin, optically transparent, electrically conductive layer of tin oxide.) In close proximity to the injecting electrode 140 and parallel thereto is a second roller 144, commonly referred to in the art as the blocking electrode. Blocking electrode 144 has a conductive center core 146 covered with a layer of insulating material 148 such as Baryta paper. The conductive core 146 is connected to a power source 150, the opposite side of which is connected to the injecting electrode 140 through a switch 152.

Located above the injecting electrode 140 is a reservoir 154 containing a mixture of finely divided, magenta, cyan and yellow pigment particles dispersed in an insulating carrier liquid. The pigment particles are also photosensitive and are selected so that the different color particles respond to different wavelengths of light corresponding to their principal absorption (i.e., the cyan color particles are responsive to to red light, the magenta color particles are responsive to green light and the yellow color particles are responsive to blue light). Reservoir 154 supplies the suspension 156 to a coating roller 158 which applies a uniformly thick layer of the suspension to the surface of the injecting electrode 140.

A mirror 160 located within injecting electrode 140 receives the light image projected by a laser 161 controlled by the signal outputs from buffer memory 111. The laser beam is modulated at 163 by those signals and is deflected at 165 in a manner as described in Spaulding U.S. Pat. No. 3,783,185. Mirror 160 reflects the light image through an exposure slit 162 onto imaging suspension 156 at a line of contact where injecting electrode 140 contacts the blocking electrode 144.

During the imaging process, suspension 156 is exposed by raster scanning the laser in synchronism with the rotation of injecting electrode 140 and blocking electrode 144 by a motor 164 while a potential is applied across the electrodes through the closed switch 152. The pigment particles are believed to bear an initial charge when suspended in the liquid carrier which attracts them to injecting electrode 140. Upon exposure, the particles change polarities by exchanging charge with injecting electrode 140 and migrate away from this electrode to blocking electrode 144 thereby forming a positive image on injecting electrode 140 and a complimentary negative image on blocking electrode 144 by particle subtraction.

The image formed on the surface of injecting electrode 140 is then carried into contact with an adhesive copy sheet 166 fed from a supply, not shown, so that the copy sheet moves at the same speed as the periphery of injecting electrode 140. A pressure roller 168 is placed behind sheet 166 at the point of contact with injecting electrode 140 to assist in the transfer of the image from the surface of the injecting electrode onto the surface of the copy sheet. The transferred image is then fixed in place by transporting the sheet past a dryer unit, not shown, whereat a binder material, dissolved in the liquid carrier comes out of solution as the relatively volatile carrier liquid evaporates. The remnants of the suspension 156 are then removed from the surface of injecting electrode 140 by a brush 170 and from the surface of the blocking electrode 144 by a brush 172 in preparation for the next imaging cycle of the apparatus.

SYNCHRONIZATION

As will be understood by those skilled in the art, characters from deflector 165 must be applied in timed relation with the movement of injecting electrode 140 and blocking electrode 148 so that the relative position of each discrete image portion on receiver medium 166 corresponds to the relative position of its respective counterpart area of original document 54. It should be noted that the electrophotographic apparatus as shown schematically is being driven by motor 164. Also shown schematically is a dotted-line connection 173 with the main drive shaft of blocking electrode 144 which applies a signal to a shaft encoder 174. The shaft encoder in turn applies a series of signals to logic and control unit 176 (FIG. 1) along dotted-line connection 177. The logic and control apparatus is adapted to determine just how fast the members 144 and 140 are moving. After it has computed this relationship logic and control unit 176, in turn, feeds back signals to buffer 111 as shown in FIG. 5 along dotted-line connection 178 and also to document reader 42 shown in FIG. 1. Thus, it should now be clear that the operation of all the devices are actually in timed synchronization with the movement of the members 140 and 144.

An example of a logic and control apparatus which can perform the aforementioned described operations is set forth in detail in co-assigned co-pending U.S. Patent Application Ser. No. 550,104, entitled SYNCHRONIZING CONTROL APPARATUS FOR ELECTROGRAPHIC APPARATUS USING DIGITAL COMPUTERS, filed in the names of Hunt et al. on Feb. 13, 1975. Briefly reviewing that application, it does not in fact describe the shaft encoder, but what it does show are perforations along an electrophotographic member which are read by sensing apparatus to produce two series of control signals which in turn apply to logic and control apparatus. Although a shaft encoder has been shown schematically in FIG. 5, it will be understood that the perforations or marks on a moving member technique shown in the aforementioned co-pending application can be used to advantage in this application.

It should further be clear to one skilled in the art that the reading operation of the apparatus shown in FIG. 2 will have to also be synchronized to the operation of the electrophotographic apparatus. Towards this end page scan mirror 52, which is controlled by a galvanometer drive motor 62, will be understood to be under the direct control of logic and control unit 176. Reference is also called to commonly assigned U.S. Pat. No. 3,864,697, issued Feb. 4, 1975 to Dillon et al, which also shows synchronization and control apparatus that can, as will be understood to those skilled in the art, be modified to provide the aforementioned described operations.

The invention has been described in detail with particular reference to preferred embodiments thereof, but it will be understood that variations and modifications can be effected within the spirit and scope of the invention.

I claim:

1. In a document copying apparatus of the type including (1) reading means for generating a plurality of electrical signals which are serial measures of imagewise information of successive discrete areas of an original document to be reproduced, (2) image recording means responsive to applied electrical signals for forming discrete image portions on a receiver medium corresponding to the imagewise information contained in said applied electrical signals, and (3) control means associated with said reading means and said recording means for controlling the format of the recording of said discrete image portions so that the relative position of each such image portion on the receiver medium corresponds to the relative position of its respective counterpart area of the original document; the improvement comprising programmed computation means for (1) receiving said generated signals, (2) applying a compensating function to said generated signals to modify the imagewise information contained therein and (3) applying the compensated signals to said image recording means; said computation means including means for enhancing the color information in said generated signals by correcting for characteristics of the colorant set in the original document.

2. In a document copying apparatus of the type including (1) reading means for generating a plurality of electrical signals which are serial measures of imagewise information of successive discrete areas of an original document to be reproduced, (2) image recording means responsive to applied electrical signals for forming discrete image portions on a receiver medium corresponding to the imagewise information contained in said applied electrical signals, and (3) control means associated with said reading means and said recording means for controlling the format of the recording of said discrete image portions so that the relative position of each such image portion on the receiver medium corresponds to the relative position of its respective counterpart area of the original document; the improvement comprising programmed computation means for (1) receiving said generated signals, (2) applying a compensating function to said generated signals to modify the imagewise information contained therein and (3) applying the compensated signals to said image recording means; said computation means including means for correcting for color saturation losses in the original document.

3. In a document copying apparatus of the type including (1) reading means for generating a plurality of electrical signals which are serial measures of imagewise information of successive discrete areas of an original document to be reproduced, (2) image recording means responsive to applied electrical signals for forming discrete image portions on a receiver medium corresponding to the imagewise information contained in said applied electrical signals, and (3) control means associated with said reading means and said recording means for controlling the format of the recording of said discrete image portions so that the relative position of each such image portion on the receiver medium corresponds to the relative position of its respective counterpart area of the original document; the improvement comprising programmed computation means for (1) receiving said generated signals, (2) applying a compensating function to said generated signals to modify the imagewise information contained therein and (3) applying the compensated signals to said image recording means; said computation means including means for correcting for characteristics of hue in the original document.

4. In a document copying apparatus of the type including (1) reading means for generating a plurality of electrical signals which are serial measures of imagewise information of successive discrete areas of an original document to be reproduced, (2) image recording means responsive to applied electrical signals for forming discrete image portions on a receiver medium corresponding to the imagewise information contained in said applied electrical signals, and (3) control means associated with said reading means and said recording means for controlling the format of the recording of said discrete image portions so that the relative position of each such image portion on the receiver medium corresponds to the relative position of its respective counterpart area of the original document; the improvement comprising programmed computation means for (1 ) receiving said generated signals, (2) applying a compensating function to said generated signals to modify the imagewise information contained therein and (3) applying the compensated signals to said image recording means; said computation means including means for correcting for characteristics of contrast in the original document.

5. In a document copying apparatus of the type including (1) reading means for generating a plurality of electrical signals which are serial measures of imagewise information of successive discrete areas of an original document to be reproduced, (2) image recording means responsive to applied electrical signals for forming discrete image portions on a receiver medium corresponding to the imagewise information contained in said applied electrical signals, and (3) control means associated with said reading means and said recording means for controlling the format of the recording of said discrete image portions so that the relative position of each such image portion on the receiver medium corresponds to the relative position of its respective counterpart area of the original document; the improvement comprising programmed computation means for (1) receiving said generated signals, (2) applying a compensating function to said generated signals to modify the imagewise information contained therein and (3) applying the compensated signals to said image recording means; said computation means comprising digital table look-up means for applying said compensating function to said generated signals.

6. The improvement as defined in claim 5 wherein said digital table look-up means comprises a read-only memory.

7. Apparatus for processing a series of input electrical signals which are linear measures of a characteristic of imagewise information of successive discrete areas on an object to be imaged, said apparatus comprising:
   means for converting said input signals to forms which are more efficient for applying a corrective function thereto; and
   programmed computation means for applying a corrective function to said converted input signals to produce output signals in which the imagewise information is modified from that of said input signals.

8. Apparatus as defined in claim 7 wherein said converting means converts said input signals to forms which are substantially linear with respect to human visual color error tolerances.

9. Apparatus as defined in claim 7 wherein said input electrical signals are analog and said computation means comprises digital table look-up means for applying said corrective function, and further comprising analog-to-digital conversion means responsive to said converted signals to produce digital signals corresponding thereto.

10. In a document copying apparatus of the type including (1) reading means for generating a plurality of electrical signals which are serial measures of imagewise information of successive discrete areas of an original document to be reproduced, (2) image recording means responsive to applied electrical signals for forming discrete image portions on a receiver medium, and (3) control means associated with said reading means and said recording means for controlling the format of the recording of said discrete image portions so that the relative position of each such image portion on the receiver medium corresponds to the relative position of its respective counterpart area of the original document; the improvement comprising:
  means for converting said generated signals to forms which are more efficient for applying a corrective function thereto;
  programmed computation means for applying a corrective function to said converted signals to produce output signals in which the imagewise information is modified from that of said generated signals; and
  means for converting said output signals to forms which are more efficient for forming an image on the receiver medium by said recording means.

11. The improvement as defined in claim 10 wherein said means for converting said output signals converts said output signals to forms which are substantially linear with respect to control functions of said recording means.

12. The improvement as defined in claim 10 wherein said means for converting said output signals comprises digital table look-up means for applying converting functions to said output signals.

13. The improvement as defined in claim 12 wherein said digital table look-up means comprises at least one read-only memory.

14. Apparatus for processing a series of input electrical signals which are linear measures of a characteristic of imagewise information of successive discrete areas of an object to be imaged, said apparatus comprising:
  means for converting said input signals to forms which are substantially linear with respect to human visual color error tolerances, whereby said converted signals are more efficient than said input signals for application to a buffer memory; and
  a buffer memory adapted to receive said converted signals and to store said received signals for subsequent use.

15. In a document copying apparatus of the type including (1) reading means for generating a plurality of electrical signals which are serial measures of imagewise information of successive discrete areas of an original document to be reproduced, (2) image recording means responsive to applied electrical signals for forming discrete image portions on a received medium, and (3) control means associated with said reading means and said recording means for controlling the format of the recording of said discrete image portions so that the relative position of each such image portion on the receiver medium corresponds to the relative position of its respective counterpart area of the original document; the improvement comprising electronic unsharp masking means responsive to said generated signals for suppressing undesirable noise in said generated signals.

16. In a document copying apparatus of the type including (1) reading means for generating a plurality of electrical signals which are serial measures of imagewise information of successive discrete areas of an original document to be reproduced, (2) image recording means responsive to applied electrical signals for forming discrete image portions on a received medium, and (3) control means associated with said reading means and said recording means for controlling the format of the recording of said discrete image portions so that the relative position of each such image portion on the receiver medium corresponds to the relative position of its respective counterpart area of the original document; the improvement comprising electronic unsharp masking means responsive to said generated signals for enhancing edge sharpness in the image formed by said recording means.

17. In a color document copying apparatus of the type including (1) reading means for generating a luminance electrical signal and second and third electrical signals which are respectively serial measures of the red and blue color components of the imagewise information of successive discrete areas of an original document to be reproduced, (2) color image recording means responsive to applied electrical signals for forming discrete color image portions on a receiver medium, and (3) control means associated with said reading means and said recording means for controlling the format of the recording of said discrete image portions so that the relative position of each such image portion on the receiver medium corresponds to the relative position of its respective counterpart area of the original document; the improvement comprising:
  means to convert said second and third electrical signals to two essentially orthogonal chrominance signals; and
  means for applying said luminance and two chrominance signals to said recording means.

18. The improvement as defined in claim 17 wherein said means for converting said pair of generated signals to chrominance signals comprises a color difference matrix.

19. The improvement as defined in claim 17 wherein said reading means for generating said luminance signal comprises:
  means for generating a light beam containing the red, green and blue color components of said color document;
  a photosensor in the path of said light beam; and
  a filter between said light beam generating means and said photosensor, said filter having red, green and blue spectral transmittance characteristics selected so that, for a neutral gray area of the color document, the relative red, green and blue contributions to the luminance signal are in proportion to what the red, green and blue contributions would be if the color document were illuminated by CIE Source C.

20. In a color document copying apparatus of the type including (1) reading means for generating three serial electrical signals which are respectively representative of the different color inforamtion in successive discrete areas of the color document, (2) color image recording means responsive to applied electrical signals for forming discrete color image portions on a receiver medium, and (3) control means associated with said reading means and said recording means for controlling the format of the recording of said discrete image portions so that the relative position of each such image portion on the receiver medium corresponds to the relative position of its respective counterpart area of the original document; the improvement comprising:

means for converting said generated signals into one luminance signal and two essentially orthogonal chrominance signals;

means for differentially narrowing the bandwidth of said two chrominance signals; and means for applying said luminance and two chrominance signals of narrowed bandwidth to said recording means.

* * * * *